United States Patent

[11] 3,615,786

[72] Inventor Jerry A. Moskaluk
 Midlothian, Ill.
[21] Appl. No. 10,086
[22] Filed Feb. 16, 1970
[45] Patented Oct. 26, 1971
[73] Assignee CPC International Inc.
 Continuation of application Ser. No.
 705,638, Feb. 15, 1968, abandoned.

[54] SIMULTANEOUSLY OXIDIZING STARCH WITH A HYPOHALITE AND AIR
 6 Claims, No Drawings
[52] U.S. Cl. .................................................. 106/210,
 106/213, 106/214, 117/156, 127/33, 260/233.3
[51] Int. Cl. ................................................ C08b 25/02
[50] Field of Search .......................................... 106/210,
 213; 127/33

[56] References Cited
UNITED STATES PATENTS
2,354,838 8/1944 Schopmeyer ................. 127/33

Primary Examiner—Theodore Morris
Attorneys—Frank E. Robbins, James L. Bailey, Janet E. Price, Robert D. Weist and Martha A. Michaels ABSTRACT: Covers a method of oxidizing starch. Particularly covers a method of oxidizing starch by first forming a basic aqueous slurry of starch, and then oxidizing said starch in slurry form by treatment with dual oxidants comprising an alkali metal hypohalite, such as sodium hypochlorite, and a source of oxygen. In a preferred embodiment the oxidation is carried out by addition of an alkali metal hypohalite, such as sodium hypochlorite to the starch slurry and by bubbling in air through the alkali metal hypohalite-treated starch slurry during the oxidation reaction. The oxidized granular starch product can be recovered in dry form and is particularly useful as a binder in a paper-coating composition.

SIMULTANEOUSLY OXIDIZING STARCH WITH A HYPOHALITE AND AIR

This application is a continuation of my copending application, Ser. No. 705,638, filed Feb. 15, 1968, now abandoned.

There has been an ever-continuing demand for a coating material which may be applied to a number of varying substrates, which coating will impart to the treated article improved properties. For example, coatings are often applied to cellulosic fibrous materials such as textiles and paper. As one specific example, in the area of textile treatment, coatings are applied in order to increase water and oil resistance, crease-resistance, and render the material soft to the touch, etc.

The art has been particularly developed with respect to coating paper in order to improve its water resistance, wet and dry strengths, absorbence capacity for printing inks, optical properties, etc. Specifically, there has been an increased demand for coated paper and cardboard with increased opacity.

Generally, the most important components of a coating preparation for paper are usually a pigment, such as clay, and a binding agent, which serves to bind the pigment particles together and make them adhere to the paper surface.

Various types of starches have been used for many years as binding agents in coating preparations for paper. Without some type of modification, however, starch, and particularly cornstarch, cannot be used as a coating adhesive due to its high past viscosity and setback or retrogradation property. Thus to avoid this, prior to incorporation into the coating formulation the starch is modified by a variety of techniques including enzyme conversion, derivatiziation, oxidation, dextrinization, etc.

To increase throughput, the paper makes is continually increasing coater speeds. This in turn requires a coating composition with a relatively high total solids content with less water to evaporate. Yet, this leads to a problem of excessive viscosity, particularly imparted to the coating composition by the relatively high solids content of the utilized starch binder. The paste viscosity is thus increased to the point where the coating composition becomes impractical to use as such, or as a minimum detriment causes severe problems of uneven coating, extreme difficulty in application, etc. In some cases, to counteract this problem of excess viscosity, starches have been extensively modified to the point where the film-forming and water-holding properties as well as adhesive strength have been extensively reduced.

It would therefore be an advance in the art if a starch could be made by some method such as an oxidative procedure whereby the starch product would not exhibit excessive viscosity in water, and yet was not overly modified by oxidation to the point where it even partially loses some of the desired properties sought when employed as a binder in paper-coating compositions. If a method of oxidizing starch were known which produced a granular oxidized starch of relatively low viscosity and yet which exhibited successful utility as a binder in paper-coating compositions, such method would be a distinct improvement over prior art starch-oxidation processes. Such a proposed method would be even more attractive if it were simple and practical to carry out from a commercial standpoint In view of the above it therefore becomes an object of the invention to provide an improved method of oxidizing starch.

A more specific object of the invention is to provide a process for oxidizing starch whereby the final granular starch product is low in viscosity in the relative sense, and nevertheless possesses all the desirable properties necessary for successful utility as a binder in paper-coating compositions.

A still further object of the invention is to provide a granular oxidized starch derived from the above method.

Yet another object of the invention is to provide a paper-coating composition including a granular oxidized starch produced from the method of the invention and an inorganic pigment such as clay.

Other objects will appear hereinafter.

In accordance with the invention a new and improved method of oxidizing starch has been discovered. Broadly speaking, the process of the invention comprises the step of first forming an aqueous slurry of starch which additionally contains an alkaline substance. The alkaline starch is then oxidized by dual treatment with an alkali metal hypohalite, such as sodium hypochlorite and a source of oxygen.

In a greatly preferred embodiment a starch slurry is treated by addition of alkali metal hypohalite, and the oxidation then carried out by bubbling in the second oxidant, namely oxygen in form of air, during the oxidation reaction. Most preferably, air is bubbled in during the whole of the reaction. It should be understood, of course, that treatment with air or any other source of oxygen need not necessarily be effected throughout the entire oxidation reaction, though such mode of treatment yields optimum results. In some cases, it may not be necessary to subject the starch slurry containing alkali metal hypohalite to the oxidative effect of air or pure oxygen throughout the entire course of the reaction. Thus, the air or oxygen addition may be effected by means of bubblers or other modes or addition during say only over one-fourth to three-fourths of the reaction time.

In other embodiments ozone or chlorine dioxide may be used to generate oxygen. These modes of treatment however are obviously not preferred from a practical standpoint.

It is important that the aqueous starch slurry be first base-treated, and then the alkaline slurry be oxidized. This sequence of steps should be carried out in order to form a final oxidized granular starch product which exhibits a relatively low viscosity in water, one of the primary advantages achieved via the process of the invention.

The granular oxidized starch products obtained via the method described here exhibited relatively low viscosity in water, yet nevertheless are excellent binders for paper-coating compositions. That is, no desirable properties of adhesion, water-holding, film-forming, etc. are sacrificed even though the products described here exhibit such low viscosity. As a direct result of this low viscosity characteristic, the binders may be used in relatively high concentrations along with a pigment to give a total paper-coating composition of high solids content. This allows the coating operation to be carried on at a higher speed than heretofore possible, thereby increasing overall throughput when coating paper.

DETAILED DESCRIPTION OF THE INVENTION

The first step in the process of the invention involves formation of an alkaline aqueous slurry of starch. The starting granular starch material that may be used in practicing the invention may be derived from any vegetable source, such as, for example, corn, wheat, potato, tapioca, rice, sago and grain sorghum. Waxy starches may also be used, and a waxy milo starch is a preferred starting material.

The alkaline slurry itself may be made up in a number of ways. For example, the starch may be dispersed in water and an alkaline substance added thereto. Likewise, an alkaline solution may be prepared to which is then added starch.

The amount of starch solids present in the slurry may vary widely. Typically the slurry undergoing treatment contains 10 to 40 percent by weight of starch based on total aqueous slurry weight. More often the starch solids content ranges from about 25 to about 35 weight percent.

The amount of base that should be initially present prior to any addition of alkali metal hypohalite is important. If insufficient base is added a product of undesirably high viscosity is obtained. On the other hand, if excess base is added the oxidation treatment does not proceed to the desired extent. Thus, to effectuate the aims of the invention a base such as sodium hydroxide, potassium hydroxide, and like basic substances should be present in an amount ranging from about 0.2 to about 1.0 percent based on the weight of the starch present. Best results are obtained when the base is present in an amount ranging from about 0.4 to about 0.8 percent based on starch weight. The most preferred base for this step, due to low cost and other factors, is sodium hydroxide.

When the appropriate amount of base, and usually a strong base, as exemplified by sodium hydroxide is added, the pH of the aqueous starch slurry over the whole of the oxidation reaction will range from about 8 to about 12. In a typical run the initial pH prior to addition of hypohalite will range from about 9 to about 12. At the termination of the oxidation the pH will usually fall within the range of 9 to 11.

After the alkaline aqueous starch slurry has been constituted it is generally preferred to mix the slurry for a few minutes to insure uniformity. Also, the temperature of the slurry during this mixing is generally raised. It is important not to elevate the temperature to that point where gelatinization takes place, since it is greatly desired to isolate an oxidized starch in granular or nongelatinized form. Thus, for example, the temperature is usually raised from say 80° F. to a maximum temperature less than the gelatinization pasting temperature. More often, the temperature during this mixing step, and thereafter during the oxidation step, ranges from about 80° to about 140° F., and more often falls within the range of 100° to 120° F.

It should be understood, of course, that the oxidation reaction described immediately following may also be effected at room temperature without departing from the scope of the invention. In such case, of course, a slower oxidizing rate is seen, requiring an excessively long process time which involves undue equipment tieup.

The next step in the invention involves addition of an alkali metal hypohalite to the basic starch slurry. Typical hypohalites include sodium and potassium hypohalite. For sake of convenience and understandability, the subsequent discussion will be limited to sodium hypochlorite. It is understood, of course, that similar alkali metal hypohalites are just as adaptable for use in the instant process.

After the aqueous basic starch slurry containing alkali metal hypohalite has been constituted, the hypohalite containing starch slurry is treated with some source of oxygen. Thus, for example, a solid or liquid substance may be added to the starch slurry, which substance slowly releases oxygen during part or all of the course of the oxidation reaction. Likewise, oxygen itself may be bubbled into the reaction mixture. From a practical aspect in terms of ease of operation and economic considerations, air is bubbled into the reaction mass during the oxidation step. Here spargers or similar bubbling devices may be utilized. As noted above, the air oxidant addition may take place during all or only over a portion of the actual reaction time.

The final granular oxidized starch product for best results in terms of proper application and performance should have a range of viscosity falling within a certain level. That is, if the viscosity is excessive, the starch product cannot be utilized or is only so employed with difficulty. As one example, a high viscosity starch binder does not allow proper mixture with inorganic pigment such as clay. On the other hand, starch products of low viscosity do not exhibit the proper adhesiveness necessary for performance as a suitable binder. We have found that oxidized starches suitable as binders in paper-coating compositions have a viscosity ranging from about 1,000 to about 70,000 centipoises when measured as a 26-percent solids starch paste after the paste is held for a period of one hour at 150° F. Oxidized granular starches falling within this viscosity range are easily attained by following the procedures set out herein. More typical starch products have a viscosity falling within the range of 20,000 to 30,000 centipoises as measured above.

In order to achieve properly oxidized products as just described, the level of sodium hypochlorite must be appropriate. We have found that sodium hypochlorite or other alkali metal hypohalites should preferably be added in an amount ranging from about 1 to about 8 percent on starch weight, and more often ranging from 1 to 2 percent. If amounts of sodium hypochlorite much above the maximum limit are added, thinned starches of low viscosity and poor adhesiveness are realized. On the other hand, insufficient additive amounts of sodium hypochlorite results in oxidized starches of excessive viscosity possessing drawbacks as noted above.

Expressed in another light, sufficient sodium hypochlorite or alkali metal hypohalite should be added to make available 0.9 to 1.3 percent halogen expressed as chlorine, said percentage range being based on starch solids present. Halogen levels within this range yields products of desirable properties, and particularly of proper viscosity range, as just noted.

The time over which the oxidation is run may vary considerably depending upon the size of the batch and other variables involved. In typical runs, the oxidation is carried out over a period of time ranging from about ½ hour to about 2 hours. The sodium hypochlorite may be added over this entire time, or it may be added in a single addition at the initial part of the oxidation step or slugwise as needed. Usually, the sodium hypochlorite is added at the first step of the reaction, and the thus treated starch allowed to react over the remainder of time allotted.

Again, the temperature during the oxidation step usually falls within the range of 80° to 140° F., and more often ranges from about 100° to about 120° F. However, the oxidation reaction may be run within any temperature ranging from room temperature up to the gelatinization temperature of the particular starch being oxidized.

At the completion of the oxidation step, it is greatly preferred that residual hypohalite such as sodium hypochlorite be neutralized. Generally a reducing agent such as sodium bisulfite is effective here. Other known reducing agents may also be utilized, such as sodium metabisulfite, thiosulfates, hydrosulfites, etc.

For obvious reasons of advantage, the oxidized starch as marketed and shipped should be in solid or a substantially dry granular form. A number of known techniques may be utilized to separate the oxidized granular starch from the aqueous reaction mixture. As just one example, the granular oxidized starch is easily and conveniently filtered from the suspending water medium. The product is then preferably washed. The finally prepared oxidized starch is essentially neutral or slight alkaline when redispersed in water.

By carefully following the steps of the invention in the sequence outlined above a number of process and product advantages are realized compared to the conventional method of oxidation by hypochlorite oxidation without benefit of oxygen treatment and where an alkali is not added at the outset of the process. For example, by following the process of the invention approximately a 50 percent increase in yield of oxidized starch is noted. This is primarily due to the fact that less solubles are produced in the process, which soluble material cannot generally be recovered. In another light, to obtain starches of various fluidities, it usually takes approximately 50 percent less hypochlorite addition to achieve a product similar to one realized in the prior art method. As one example, in order to produce an 80 fluidity starch, 2 percent hypochlorite is utilized as oxidant in the process of the invention. To utilize the same fluidity starch by the prior art method, about 3 percent sodium hypochlorite is required.

As still another advance, we have found that paper pulp treated with oxidized starches in accordance with the invention or a dried paper article likewise treated when repulped, do not cause undesirable coagulation during processing. Like papers treated with oxidized starches from the prior art method when repulped do cause this undesired phenomenon of flocculation. This is probably due to the excessively high carboxyl content of oxidized starches made from the prior art method which imparts a relatively high anionic charge to papers treated therewith. The thus treated paper when repulped is then capable of acting as a coagulant.

PAPER-COATING COMPOSITIONS

Typical paper-coating compositions useful here generally comprise a mixture of water with clay or another inert mineral pigment and an oxidized starch binder made in accordance with this invention. A dispersing agent, such as sodium hexamethaphosphate, trisodium polyphosphate, tetrasodium pyrophosphate, or the corresponding potassium salts is often added. Moreover, an alkaline material, such as sodium hydroxide, ammonium hydroxide, or various other alkaline salts or hydroxides of alkali metals can also be present. The dispersing agent, together with the alkaline material serves to disperse the pigment. The alkaline material also aids in adjusting the pH to the desired value for the coating application, which frequently is about pH 8. If desired, various other additives such as antifoaming agents and preservatives can also be added.

When employed as binders the granular oxidized starches must be first gelatinized or pasted. That is, they must be first "cooked" in water or heated to the gel point temperature of the starch. The gelatinization step is normally carried out on the starch alone, although the coating composition may be first formulated and then the starch gelatinized in presence of pigment.

The pigment portion of the coating slip may be chosen from a wide variety of inorganic metallic pigments such as clay, talc, titanium dioxide, blanc fixe, powdered tin, precipitated chalk, satin white, ground limestone, etc. Preferred, due to ready availability and relatively low cost, is clay.

The amounts of the various substituents of the coating preparations are naturally strongly dependent upon the type and amount of oxidized starch, the type of inorganic pigment, process of application of coating, as well as the specific properties desired in the finally coated paper. Generally speaking, the coating color contains 20 to 70 percent solids, including 30 to 60 percent of one or more of the above discussed inorganic pigments based on solids weight, and 5 to 25 percent of the oxidized starch binder of the invention, based on total solids weight. The above percentage figures are expressed in weight percent. It is understood, of course, that other known binders, including additional modified and unmodified starch binders may be used along with the oxidized starch-binder materials herein defined without departing from the scope of the invention.

The actual introduction of the new coating preparations described herein in treating paper can be carried out in a variety of ways. Thus, for example, one may use coating members such as an air knife, application roll, a bar wrapped with a wire, a "trailing blade" and a sealing press.

The following examples illustrate a specific preparation of a typical oxidized starch of the invention and its use as a binder in a paper coating. These examples are meant to be illustrative and the invention, of course, is not to be limited thereto. All parts and percentages are by weight unless expressly stated to be otherwise.

EXAMPLE I

Preparation of an Oxidized Starch

Sufficient white milo starch was first dispersed in water to make up a starch slurry containing 39 percent solids. The pH of the starch slurry was then base adjusted by addition of 0.6 percent sodium hydroxide calculated on starch solids. The initial pH prior to the oxidation reaction was about 11.5. The slurry was then heated to 110° F. at which time sodium hypochlorite was added. Specifically, enough sodium hypochlorite was added to yield 1.15 percent available chlorine based on starch weight. Thereafter, the oxidation reaction was carried out by bubbling air through the reaction slurry at the bottom of the reaction vessel for 1 hour at 110° F. The air-bubbling caused turbulent action so that the starch slurry was mildly agitated during the reaction.

The product obtained had a desirable relatively low paste viscosity of about 3000 c.p.s. when held for one hour at 150° F. at 26.5 percent solids. At room temperature the paste was still fluid and had a Brookfield viscosity of about 10,000 c.p.s. when measured at 26.5 percent solids.

It was noted that the carboxyl content, Scott viscosity, and carbonyl content of the product of this example were essentially the same as those measurements made on a conventionally produced oxidized starch, that is, a starch made via oxidation with simultaneous addition of alkali and sodium hypochlorite.

EXAMPLE II

Here an oxidized starch was prepared according to the techniques outlined above but on a relatively large scale. 1,361 grams of sodium hydroxide pellets were dissolved in 25.84 kilograms of water and the solution was then added to 835 pounds of water. Five hundred pounds of white milo starch was then slurried in the above caustic solution. The slurry pH was 11.5. The temperature of the slurry was raised to 110° F. and sodium hypochlorite solution was added to yield 1.1 percent available chlorine based on starch weight. Air was then introduced at the bottom of the tank at two points in a manner whereby the air bubbled to the surface of the agitated slurry. At the end of 1 hour of oxidation, the pH was adjusted to 4.5 The granular oxidized product was then filtered, washed with water and dried at 175° F. to a point of 10 percent moisture. The product had the following characteristics:

PRODUCT CHARACTERISTICS

| | |
|---|---|
| Intrinsic viscosity | 0.87 |
| Scott viscosity | 25 g./48 |
| Brookfield viscosity (26% starch paste, 1 hour at 150° F.), cps. | 8,000 |
| Carboxyl, percent | 0.05 |
| Carbonyl, percent | 0.03 |
| Ash, percent | 0.15 |

EXAMPLE III

In this run the oxidized starch product described in Example II was evaluated as a binder in a paper-coating composition. The technique of coating color formation was that commonly used in the trade, that is, gelatinized starch was first added to the pigment slip. The gelatinization of the oxidized starch was accomplished by live steam injection means. The slip was prepared from kaolin clay using tetrasodium pyrophosphate as a dispersant. The coating color was applied to paper by means of a trailing blade coater.

Acid-modified white milo starch and hydroxyethyl cornstarch, both products commercially used as binders, were also evaluated. The oxidized starch of the invention gave results comparable to these commercial products.

TABLE I.—PERFORMANCE OF OXIDIZED STARCH AS A BINDER IN PAPER COATING

| Starch | Percent— | | Brookfield viscosity, cps. | Coat weight | Wax pick |
|---|---|---|---|---|---|
| | Total solids | Adhesive | | | |
| Oxidized white milo | 55 | 18 | 1,025 | 6.2 | 9 |
| | 55 | 15 | 740 | 7.5 | 7 |
| | 59.2 | 18 | 4,350 | 9.3 | 8.5 |

EXAMPLE IV

The Importance of Oxygen Addition

This example illustrates the importance in addition oxygen at least a portion of the reaction to the already sodium hypochlorite-treated starch slurry.

In this run oxidation was carried under similar conditions as set out in Example I using identical reagent concentrations but without the aid of air passed through the reaction mixture. The resultant product had a relatively high past viscosity at room temperature of 70,000 - 90,000 c.p.s. when measured at 26.5 percent solids.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows.

1. In an alkaline hypohalite oxidation process for preparing a granular oxidized starch product from an alkaline aqueous slurry of granular raw starch, under nongelatinizing conditions, the improvement comprising simultaneously treating said slurry with an alkali metal hypohalite while bubbling an oxygen-containing gas through said slurry at a pH in the range from about 8 to 12 and at a temperature in the range from 80° to 140° F.

2. A process as defined by claim 1 wherein simultaneous treating and bubbling is effected throughout the entire oxidation.

3. A process as defined by claim 1 wherein said gas is air.

4. A process as defined by claim 1 wherein said hypohalite is sodium hypochlorite.

5. The product prepared by the process defined by claim 1.

6. A process for preparing a granular oxidized starch that is useful as a pigment binder in a paper-coating composition comprising subjecting raw granular waxy milo starch, that is first suspended in an aqueous slurry containing from about 25 percent to about 35 percent by weight of starch solids, dry basis, at a pH in the range from about 8 to about 12, and a temperature in the range from about 100° F. to about 120° F. to the oxidizing action of from about 1 to about 8 percent by weight of sodium hypochlorite, based on starch solids, dry weight basis; simultaneously bubbling air through said slurry to complement the oxidizing action of the hypochlorite and to agitate said slurry; neutralizing the residual hypochlorite at the conclusion of the oxidation; and recovering a granular oxidized starch product.

* * * * *